United States Patent
Zhao et al.

(10) Patent No.: US 10,578,868 B2
(45) Date of Patent: Mar. 3, 2020

(54) HEAD-MOUNTED DISPLAY AND VIDEO DATA PROCESSING METHOD THEREOF

(71) Applicant: Beijing Pico Technology Co., Ltd., Beijing (CN)

(72) Inventors: Wen hui Zhao, Beijing (CN); Jin bo Ma, Beijing (CN); Chuan guo Fan, Beijing (CN); Chong Wang, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 542 days.

(21) Appl. No.: 15/140,636

(22) Filed: Apr. 28, 2016

(65) Prior Publication Data

US 2016/0321787 A1    Nov. 3, 2016

(30) Foreign Application Priority Data

Apr. 30, 2015 (CN) .......................... 2015 1 0217402

(51) Int. Cl.
*G02B 27/01* (2006.01)
*G06T 5/00* (2006.01)
(Continued)

(52) U.S. Cl.
CPC ............ *G02B 27/017* (2013.01); *G06T 5/006* (2013.01); *G02B 7/182* (2013.01); *G02B 27/0025* (2013.01); *G02B 27/01* (2013.01); *G02B 27/0172* (2013.01); *G02B 2027/014* (2013.01); *G03B 21/147* (2013.01); *G06T 5/001* (2013.01); *G06T 7/0002* (2013.01); *G09G 5/00* (2013.01); *G09G 5/001* (2013.01)

(58) Field of Classification Search
CPC ..... G06T 5/001; G06T 5/006; G02B 27/0025; G02B 27/017; G02B 2027/014; G09G 5/00
See application file for complete search history.

(56) References Cited

U.S. PATENT DOCUMENTS 6,456,340 B1 * 9/2002 Margulis .................... G06T 1/20
345/501
8,675,115 B1 * 3/2014 Gigushinski ......... H04N 5/3572
348/222.1
(Continued)

FOREIGN PATENT DOCUMENTS

CN        201780766 U      3/2011
CN        102982516 A      3/2013
(Continued)

*Primary Examiner* — Xuemei Zheng
(74) *Attorney, Agent, or Firm* — Leydig, Voit & Mayer, Ltd.

(57) ABSTRACT

The present invention discloses a head-mounted display and a video data processing method thereof. The head-mounted display comprises: a video input module, a distortion processing module and a video output module. The head-mounted display divides each image frame in a video into a plurality of image blocks of symmetry according to a graphic correspondence of a distorted image after a distortion processing, performs a distortion processing of any one of the image blocks, and obtains data of the current image frame after the distortion processing according to the graphic correspondence.

7 Claims, 4 Drawing Sheets

(51) Int. Cl.
*G09G 5/00* (2006.01)
*G02B 27/00* (2006.01)
*G02B 7/182* (2006.01)
*G03B 21/14* (2006.01)
*G06T 7/00* (2017.01)

(56) References Cited

U.S. PATENT DOCUMENTS

| | | | |
|---|---|---|---|
| 9,489,723 B2 | 11/2016 | Yoichi | |
| 9,691,181 B2* | 6/2017 | Watson | A63F 13/26 |
| 2002/0063802 A1 | 5/2002 | Gullichsen et al. | |
| 2010/0156917 A1* | 6/2010 | Lee | H04N 19/423 |
| | | | 345/543 |
| 2012/0127163 A1* | 5/2012 | Kim | H04N 13/0029 |
| | | | 345/419 |
| 2013/0222776 A1* | 8/2013 | Ishikawa | H04N 9/3185 |
| | | | 353/121 |
| 2013/0300769 A1* | 11/2013 | Huang | G09G 5/00 |
| | | | 345/658 |
| 2014/0002587 A1* | 1/2014 | Aguren | H04N 5/23238 |
| | | | 348/36 |
| 2014/0009368 A1 | 1/2014 | Yoichi | |
| 2015/0254813 A1* | 9/2015 | Foi | H04N 5/33 |
| | | | 382/275 |
| 2016/0091720 A1* | 3/2016 | Stafford | G02B 27/0172 |
| | | | 345/8 |
| 2016/0322191 A1* | 11/2016 | Sang | G01N 23/2251 |
| 2017/0039687 A1 | 2/2017 | Yoichi | |

FOREIGN PATENT DOCUMENTS

| | | |
|---|---|---|
| CN | 103533213 A | 1/2014 |
| CN | 104253989 A | 12/2014 |
| CN | 104469440 A | 3/2015 |
| WO | 2015/188731 A1 | 12/2015 |

* cited by examiner

HEAD-MOUNTED DISPLAY AND VIDEO DATA PROCESSING METHOD THEREOF

CROSS-REFERENCE TO RELATED APPLICATION

This application claims priority to and the benefit of Chinese Patent Application No.: 201510217402.1 filed Apr. 30, 2015 and titled "Head-Mounted Display and Video Data Processing Method Thereof." The contents of the above-identified Application are relied upon and incorporated herein by reference in their entirety.

TECHNICAL FIELD

The present invention relates to the technical field of visualization devices, and particularly, to a head-mounted display and a video data processing method thereof.

BACKGROUND TECHNOLOGY

With the development of science and technologies, the head-mounted display has been gradually civilianized and provides high-quality visual experiences to more and more people. When an output video is displayed on the head-mounted display, light emitted from the display screen is incident into the user's eyes through a lens group, and the image viewed by the user is deformed relative to the image displayed on the display screen since an optical distortion is generated during the light propagation. In order that the user can view a normal image, a distortion processing of video data needs to be performed in advance, and the distortion-processed video data is displayed on the display screen. The distortion can offset the optical distortion generated during the light propagation in the lens group, so that the user can view a normal 2D or 3D effect.

In the prior art, a distortion processing of video data performed by the head-mounted display is through distortion processing of each image frame in the video, and specifically, distortion processing is performed on image data using FPGA in a frame unit. But due to restrictions of the FPGA storage space, the operational capability and the transmission bandwidth, a large amount of data needs to be stored for processing a singular image frame, thus the processing in a frame unit is impracticable. Meanwhile, the processing of a large amount data leads to low bandwidth utilization ratio of the distortion processing and poor distortion processing efficiency, so the video playing cannot be ensured to be smooth and the user's viewing requirement cannot be satisfied.

SUMMARY OF THE INVENTION

In view of the above problem, the present invention provides a head-mounted display and a video data processing method thereof, so as to solve or at least partially solve the above problems.

According to an aspect of the present invention, a head-mounted display is provided, comprising:

a video input module configured to receive video data input from a video source device, and orderly output data of each image frame in the video data to a distortion processing module;

the distortion processing module configured to divide each image frame into a plurality of image blocks of symmetry according to a graphic correspondence of a distorted image after a distortion processing; perform a distortion processing of any one of the plurality of image blocks according to a distortion processing algorithm to obtain data of the image block after the distortion processing; and obtain data of the current image frame after the distortion processing according to the graphic correspondence and the data of the image block after the distortion processing;

a video output module configured to orderly output data of each image frame after the distortion processing to a display screen of the head-mounted display according to a frame rate.

Optionally, the head-mounted display further comprises: a graph zooming module;

the video input module is further configured to orderly output data of each image frame in the video data to the graph zooming module;

the graph zooming module is configured to convert image frames into an uniform format, and output data of each image frame in the uniform format to the distortion processing module.

Optionally, the distortion processing module comprises:

a DDR read-write control module configured to store a distortion processing algorithm which indicates a coordinate mapping Map relation between pixels points of a same image frame before and after a distortion processing, receive data of input image frames, divide each image frame into a plurality of image blocks of symmetry according to a graphic correspondence, and control reading and writing of data of the image blocks;

a video data buffering module configured to acquire the data of the image blocks from the DDR read-write control module and buffer the same, and output the buffered data of the image blocks to a distorted data acquiring module;

a Map data buffering module configured to acquire the Map relation from the DDR read-write control module and buffer the same, and output the buffered Map relation to the distorted data acquiring module;

the distorted data acquiring module configured to assign pixel values of pixel points at coordinates of an image block before the distortion processing to pixel points at corresponding coordinates after the distortion processing according to the Map relation of the image block, so as to obtain data of the image block after the distortion processing; and obtain data of the current image frame after the distortion processing through a mirror-image relation according to the graphic correspondence and the data of the image block after the distortion processing.

Optionally, the distorted data acquiring module is further configured to, for each pixel point of an image block before a distortion processing, acquire pixel values of a plurality of pixel points around the pixel point, obtain an optimal pixel value of the pixel point by an interpolation calculation, assign the optimal pixel value to a pixel point at corresponding coordinate after the distortion processing, and obtain data of the image block after the distortion processing according to optimal pixel values of all pixel points in the image block before the distortion processing.

Optionally, the distorted data acquiring module is further configured to amplify coordinate data of an image block before a distortion processing for a certain times; discard corresponding decimal places of the coordinate data in the Map relation, amplify the coordinate data with corresponding decimal places discarded for a certain times and then round down the same to obtain a Map relation of an integer form; assign optimal pixel values of pixel points at coordinates of the amplified image block before the distortion processing to pixel points at corresponding coordinates after the distortion processing according to the Map relation of an integer form, to obtain data of the amplified image block after the distortion processing; and contract the coordinate data of the amplified image block after the distortion processing for a certain times, to obtain data of the image block after the distortion processing.

According to another aspect of the present invention, a video data processing method of a head-mounted display is provided, comprising:

receiving video data input from a video source device;

dividing each image frame in an input video into a plurality of image blocks of symmetry according to a graphic correspondence of a distorted image after a distortion processing;

performing a distortion processing of any one of the plurality of image blocks according to a distortion processing algorithm to obtain data of the image block after the distortion processing;

obtaining data of the current image frame after the distortion processing according to the graphic correspondence and the data of the image block after the distortion processing;

orderly outputting data of each image frame after the distortion processing to a display screen of the head-mounted display according to a frame rate.

Optionally, before dividing each image frame in an input video into a plurality of image blocks according to a graphic correspondence of a distorted image after a distortion processing, the method further comprises:

converting image frames in the input video into a uniform format.

Optionally, performing a distortion processing of any one of the plurality of image blocks according to a distortion processing algorithm to obtain data of the image block after the distortion processing comprises: according to a Map relation of the image block in a coordinate mapping Map relation between pixels points of a same image frame before and after a distortion processing, assigning pixel values of pixel points at coordinates of the image block before the distortion processing to pixel points at corresponding coordinates after the distortion processing, so as to obtain data of the image block after the distortion processing;

obtaining data of the current image frame after the distortion processing according to the graphic correspondence and the data of the image block after the distortion processing comprises: obtaining data of the current image frame after the distortion processing through a mirror-image relation according to the graphic correspondence and the data of the image block after the distortion processing.

Optionally, assigning pixel values of pixel points at coordinates of the image block before the distortion processing to pixel points at corresponding coordinates after the distortion processing, so as to obtain data of the image block after the distortion processing comprises:

for each pixel point of an image block before a distortion processing, acquiring pixel values of a plurality of pixel points around the pixel point, obtaining an optimal pixel value of the pixel point by an interpolation calculation, and assigning the optimal pixel value to the pixel point at corresponding coordinate after the distortion processing;

obtaining data of the image block after the distortion processing according to optimal pixel values of all pixel points in the image block before the distortion processing.

Optionally, before for each pixel point of an image block before a distortion processing, acquiring pixel values of a plurality of pixel points around the pixel point, the method further comprises:

amplifying coordinate data of the image block before the distortion processing for a certain times;

discarding corresponding decimal places of the coordinate data in the Map relation, amplifying the coordinate data with corresponding decimal places discarded for a certain times and then rounding down the same to obtain a Map relation of an integer form;

assigning the optimal pixel value to a pixel point at corresponding coordinate after the distortion processing to obtain data of the image block after the distortion processing comprises:

assigning optimal pixel values of pixel points at coordinates of the amplified image block before the distortion processing to pixel points at corresponding coordinates after the distortion processing according to the Map relation of an integer form, to obtain data of the amplified image block after the distortion processing; and contracting the coordinate data of the amplified image block after the distortion processing for a certain times to obtain data of the image block after the distortion processing.

As can be seen from the above descriptions, the technical solutions provided by the present invention divide each image frame in the video data into a plurality of image blocks of symmetry according to a graphic correspondence of an image after a distortion processing, perform a distortion processing of any one of the plurality of image blocks, and obtain data of the current image frame after the distortion processing according to the graphic correspondence and the data of the image block after the distortion processing. Through the solutions, the head-mounted display completes the distortion processing of each image frame in the video, and outputs and displays the distortion-processed video on the display screen, so that the user can view a normal 2D or 3D effect. By dividing the image frame into blocks, the solutions realize a transmission and processing of image data in the video in a block unit, in substitution of the solution in a frame unit in the prior art, and avoid the limitation of the storage space of the distortion processing module. In addition, for an image frame, the distortion processing of a whole image frame can be completed just by selecting a singular image block, thereby greatly improving the distortion processing efficiency of the video data, ensuring a smooth video playing, and provides the user with more perfect visual experiences.

DETAILED DESCRIPTION OF THE PREFERRED EMBODIMENTS

In order that the objects, technical solutions and advantages of the present invention are clearer, the embodiments of the present invention will be further described in details with reference to the drawings.

Figure 1:
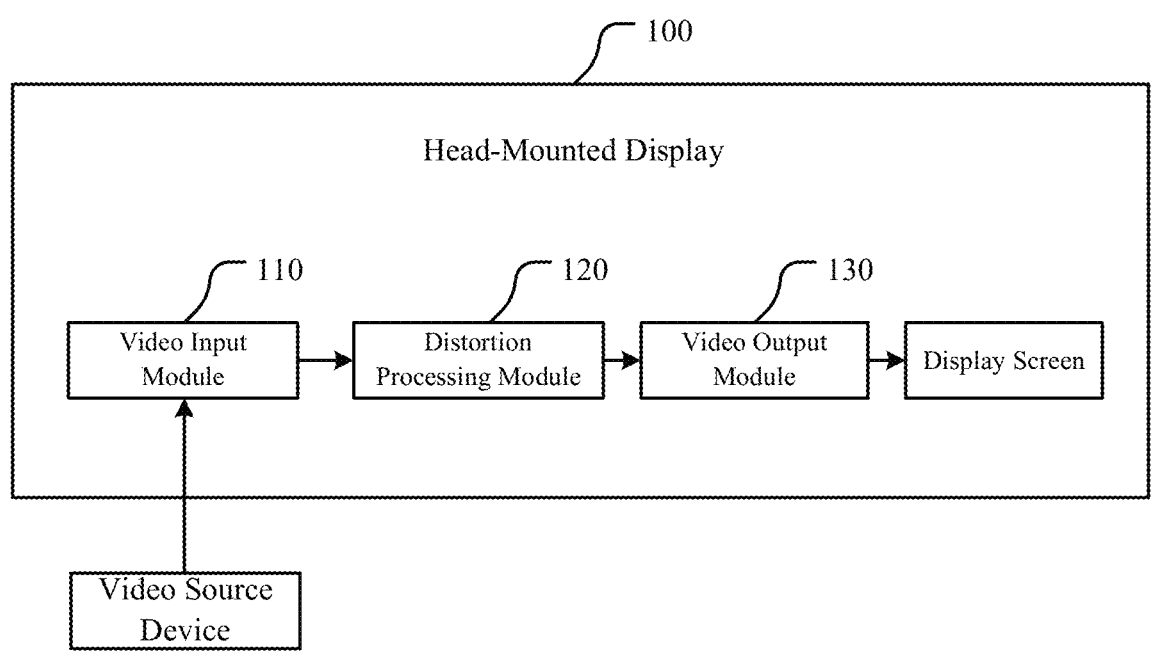
FIG. 1 illustrates a schematic diagram of a head-mounted display according to an embodiment of the present invention.

FIG. 1 illustrates a schematic diagram of a head-mounted display according to an embodiment of the present invention. As illustrated in FIG. 1, the head-mounted display 100 comprises:

a video input module 110 configured to receive video data input from a video source device, and orderly output data of each image frame in the video data to a distortion processing module;

a distortion processing module 120 configured to divide each image frame into a plurality of image blocks of symmetry according to a graphic correspondence of a distorted image after a distortion processing; perform a distortion processing of any one of the plurality of image blocks according to a distortion processing algorithm to obtain data of the image block after the distortion processing; and obtain data of the current image frame after the distortion processing according to the graphic correspondence and the data of the image block after the distortion processing;

a video output module 130 configured to orderly output data of each image frame after the distortion processing to a display screen of the head-mounted display according to a frame rate.

In this solution, before and after the distortion processing, the data of the image frame includes coordinate data and pixel value data to specifically indicate a pixel value of a pixel point at each coordinate position in the image, so as to reflect the complete information of the image.

It is clear that the head-mounted display as illustrated in FIG. 1 divides each image frame in the video data into a plurality of image blocks of symmetry according to a graphic correspondence of an image after a distortion processing, performs a distortion processing of any one of the plurality of image blocks, and obtains data of the current image frame after the distortion processing according to the graphic correspondence and the data of the image block after the distortion processing. Through this solution, the head-mounted display completes the distortion processing of each image frame in the video, and outputs and displays the distortion-processed video on the display screen, so that the user can view a normal 2D or 3D effect. By dividing the image frame into blocks, this solution realizes a transmission and processing of image data in the video in a block unit, in substitution of the processing in a frame unit in the prior art, and avoids the problem of insufficient storage space of the distortion processing module. In addition, for an image frame, the distortion processing of a whole image frame can be completed just by selecting a singular image block, thereby greatly improving the distortion processing efficiency of the video data, ensuring a smooth video playing, and provides the user with more perfect visual experiences.

Figure 2:
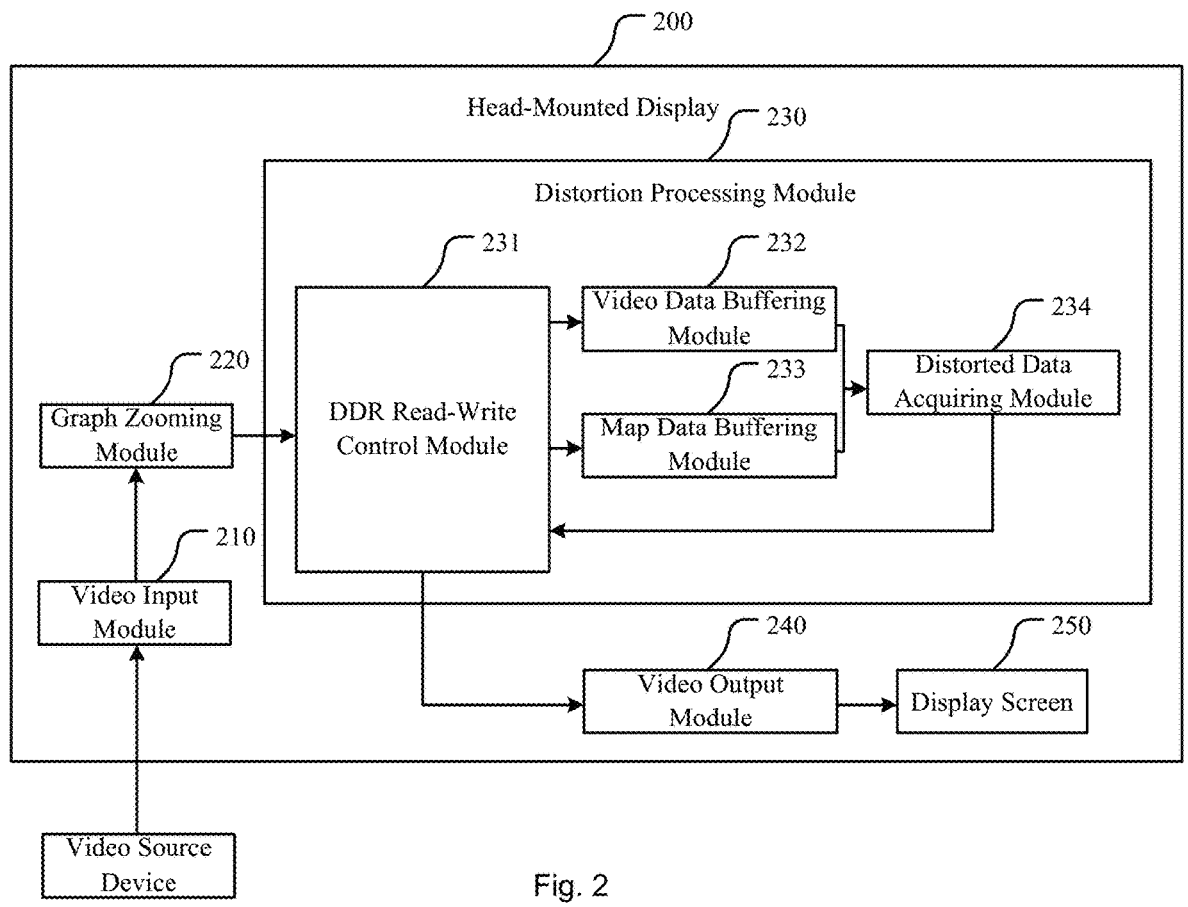
FIG. 2 illustrates a schematic diagram of a head-mounted display according to another embodiment of the present invention.

FIG. 2 illustrates a schematic diagram of a head-mounted display according to another embodiment of the present invention. As illustrated in FIG. 2, the head-mounted display 200 comprises a video input module 210, a graph zooming module 220, a distortion processing module 230, a video output module 240 and a display screen 250.

As illustrated in FIG. 2, in this embodiment, the video input module 210 receives video data input from an external video source device, detects timing of an input video, buffers the video data, and orderly outputs data of each image frame in the video data to the graph zooming module 220; the graph zooming module 220 converts image frames into an uniform format, and outputs data of each image frame in the uniform format to the distortion processing module 230; specifically, in this embodiment, the graph zooming module 220 converts all image frames into a format of 1080P; the distortion processing module 230 performs a distortion processing of each image frame, and outputs data of each image frame after the distortion processing to the video output module 240; and the video output module 240 orderly outputs the data of each image frame after the distortion processing to the display screen 250 for a user's viewing according to a frame rate.

In which, the distortion processing module 230 comprises: a DDR read-write control module 231, a video data buffering module 232, a Map data buffering module 233 and a distorted data acquiring module 234.

The DDR read-write control module 231 is configured to realize a distortion processing algorithm by controlling data reading and writing. The distortion processing algorithm indicates a coordinate mapping Map relation between pixels points of a same image frame before and after a distortion processing. The coordinate mapping Map relation is calculated through an optical space transfer according to a configuration of a lens group in the head-mounted display 200 in advance, so as to reflect the distortion processing mode required by the head-mounted display 200, and it is specifically a coordinate transformation relation between pixel points in the image frame. The DDR read-write control module 231 is also configured to receive data of image frames input from the graph zooming module 220, divide each image frame into a plurality of image blocks of symmetry according to a graphic correspondence, and read and write data of the image blocks. In this embodiment, the DDR read-write control module 231 stores the data of the image blocks with an assistance of the Double Data Rate 3 (DDR3), and reads and writes the data of the image blocks from and to other modules through the Direct Memory Access (DMA) technique.

The video data buffering module 232 is configured to acquire the data of the image blocks from the DDR read-write control module and buffer the same, and output the buffered data of the image blocks to the distorted data acquiring module 234.

The Map data buffering module 233 is configured to acquire coordinate mapping Map relation corresponding to the data of the image blocks buffered in the video data buffering module 232 from the DDR read-write control module and buffer the same, and output the buffered coordinate mapping Map relation to the distorted data acquiring module 234, wherein data of the coordinate mapping Map relation is also buffered in a block unit.

The distorted data acquiring module 234 is configured to assign pixel values of pixel points at coordinates of an image block before the distortion processing to pixel points at corresponding coordinates after the distortion processing according to the coordinate mapping Map relation, so as to obtain pixel values of pixel points at all coordinates after the distortion processing, and then obtain data of the image block after the distortion processing; and obtain data of the current image frame after the distortion processing through a mirror-image relation according to the graphic correspondence and the obtained data of the image block after the distortion processing. In this embodiment, the distorted data acquiring module 234 writes the obtained data of the image frame after the distortion processing into the DDR read-write control module 231 for a storage through DMA, and the DDR read-write control module 231 further outputs the data of each image frame after the distortion processing to the video output module 240.

Figure 3A:
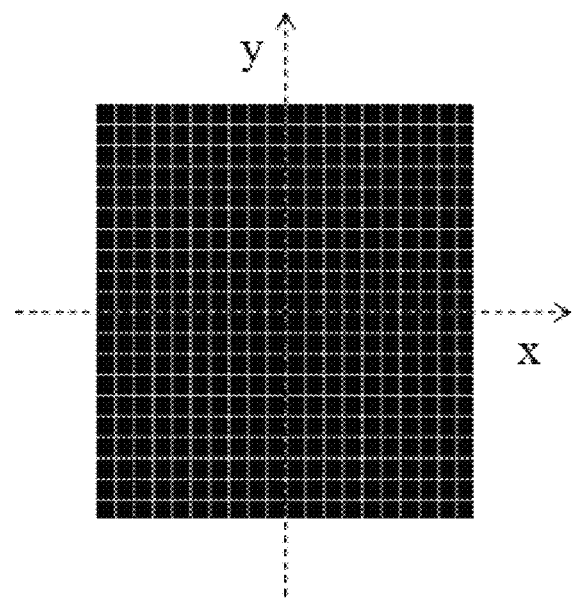
FIG. 3A illustrates a schematic diagram of an image frame before a distortion processing according to an embodiment of the present invention.
Figures 3B, 3C:
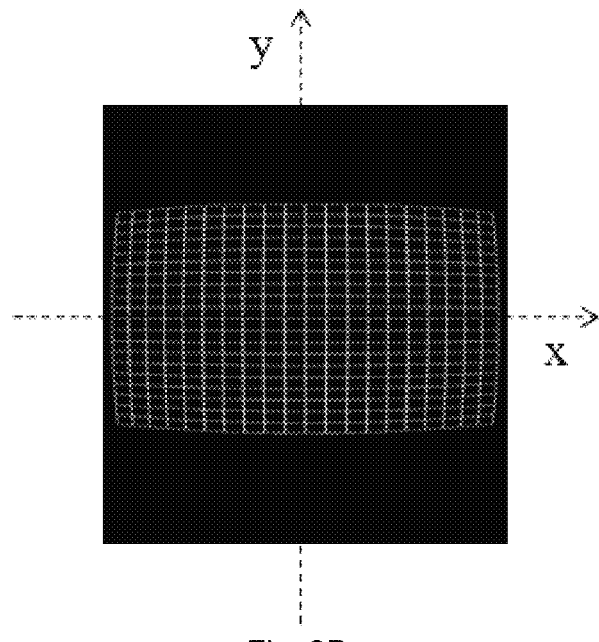
FIG. 3B illustrates a schematic diagram of an image frame after a distortion processing according to an embodiment of the present invention.
FIG. 3C illustrates a schematic diagram of a blocked distortion processing of an image frame according to an embodiment of the present invention.

FIG. 3A illustrates a schematic diagram of an image frame before a distortion processing according to an embodiment of the present invention, and FIG. 3B illustrates a schematic diagram of an image frame after a distortion processing according to an embodiment of the present invention, wherein the dotted lines indicate axes x and y of a preset reference system. As can be seen from FIGS. 3A and 3B, a graph of an image frame before a distortion processing is a rectangle, and a graph of the image frame after the distortion processing is a barrel. The graph of the image frame after the distortion processing is longitudinally symmetrical with respect to axis x, and transversely symmetrical with respect to axis y. According to the graphic correspondence, in order to reduce the volume of processed data, during distortion processing the image frame as illustrated in FIG. 3A is divided into four image blocks of symmetry through axes x and y, and any one of the image blocks (e.g., the image block in the first quadrant) is optionally selected for a distortion processing to obtain data of the image block after the distortion processing; and then the image frame after the distortion processing as illustrated in FIG. 3B is obtained through a mirror-image relation according to the symmetry.

Specifically, FIG. 3C illustrates a schematic diagram of a blocked distortion processing of an image frame according to an embodiment of the present invention. As illustrated in FIG. 3C, an image frame (rectangular graph) not distortion-processed is divided into four image blocks according to the graphic correspondence: 01-Part1, 02-Part1, 01-Part2 and 02-Part2. From the longitudinal and transverse symmetrical relations, when a Map relation corresponding to one image block is known, the distortion processing of other three image blocks can be completed just by performing a distortion processing of the one image block according to the Map relation. Thus, a singular image block 01-Part1 is selected and further divided into a plurality of small image blocks, i.e., a small image block 1, a small image block 2, a small image block 3 and a small image block 4 as illustrated in FIG. 3C. A distortion processing of the small image block 1 is performed according to a Map relation corresponding to the small image block 1, so as to obtain the small image block 1 after the distortion processing. As can be seen from the graphic correspondence, the Map relation of the small image block 1 is the same as those of a small image block 1A, a small image block 1B and a small image block 1C among the other three image blocks, thus the small image block 1A after the distortion processing, the small image block 1B after the distortion processing and the small image block 1C after the distortion processing are obtained. Similarly, results of distortion processing of a small image block 2A, a small image block 2B and a small image block 2C in the other three image blocks can be obtained by performing a distortion processing of the small image block 2. In a similar fashion, the distortion processing of the whole image frame is performed by completing the distortion processing of the singular image block 01-Part1. As also can be seen from FIG. 3B, in the image frame after the distortion processing, the boundary is compressed at a high degree, while the middle is compressed at a low degree, thus the data volume of the boundary block is small and the data volume of the middle block is large. In order to balance the bandwidth rate, when each small image block in the singular image block is processed orderly in this embodiment, data processing is performed by processing the boundary small image blocks and the middle small image blocks alternatively. That is, during the distortion processing of the image block 01-Part1 in this embodiment, the boundary small image block 1, the middle small image block 2, the boundary small image block 3 and the middle small image block 4 are processed orderly, and the rest can be done in the same manner till the processing of the image block is completed. During the above processing, the maximum block is combined with the minimum block, and corresponding symmetrical blocks are processed through the symmetrical relation. In this way, the limitation of the internal storage space of the distortion processing module can be avoided, and the data volume of Map relations to be stored is reduced at the same time.

The embodiments of the present invention only disclose the technical solutions for distortion processing of the image frame received by a singular eye of the user, and in case of both eyes of the user, the image frame after the distortion processing corresponding to both eyes of the user can be achieved through a coordinate translation of the image frame after the distortion processing corresponding to the singular eye of the user, because the distortion-process image frames received by the left and right eyes are the same.

In one embodiment of the present invention, in order to improve the image quality after the distortion processing and avoid any mutation of pixel value therein, the distorted data acquiring module 234 in the distortion processing module 230 as illustrated in FIG. 2 is further configured to, for each pixel point of an image block before a distortion processing, acquire pixel values of a plurality of pixel points around the pixel point, obtain an optimal pixel value of the pixel point by an interpolation calculation, assign the optimal pixel value to a pixel point at corresponding coordinate after the distortion processing, obtain optimal pixel values of the pixel points at all corresponding coordinates after the distortion processing from optimal pixel values of all pixel points in the image block before the distortion processing, and then obtain data of the image block after the distortion processing. In which, the interpolation calculation for the pixel values of the plurality of pixel points around the pixel point may be a calculation of an average value of the pixel values of the plurality of pixel points, and such processing enables the variation curve of the pixel value in the image after the distortion processing is more continuous and smooth, avoids the mutation of pixel value, and satisfies the user's visual demand.

In another embodiment of the present invention, since the number of decimal places of the coordinate data in the coordinate mapping Map relation can reach 15, while the mathematical calculation capability of the distortion processing module 230 in the head-mounted display 200 is limited, the image frame after the distortion processing is found to be seriously distorted in a Matlab simulation verification if the coordinate data in the Map relation is directly rounded down. Thus within a visual accuracy range acceptable to the user, the distorted data acquiring module 234 is further configured to amplify coordinate data of an image block before a distortion processing for a certain times; discard corresponding decimal places of the coordinate data in the Map relation, amplify the coordinate data with corresponding decimal places discarded for a certain times and then round down the same to obtain a Map relation of an integer form; assign optimal pixel values of pixel points at coordinates of the amplified image block before the distortion processing to pixel points at corresponding coordinates after the distortion processing according to the Map relation of an integer form, to obtain data of the amplified image block after the distortion processing; and contract the coordinate data of the amplified image block after the distortion processing for a certain times to obtain data of the image block after the distortion processing. This processing manner avoids performing processing by directly using decimals, and ensures the data accuracy of the image block after the distortion processing. In the early stage, the solution verifies the effective range of the processing of the coordinate data in the Map relation by using the Matlab, thereby reducing the mathematical operation load of the distortion processing module 230 without influencing the user's visual experiences, and improving the efficiency of the distortion processing.

In a specific embodiment, a processing manner verified to be effective for the coordinate data in the Map relation is to reserve three decimal places, amplifying the value for 8 times, and then rounding down the result.

Figure 4:
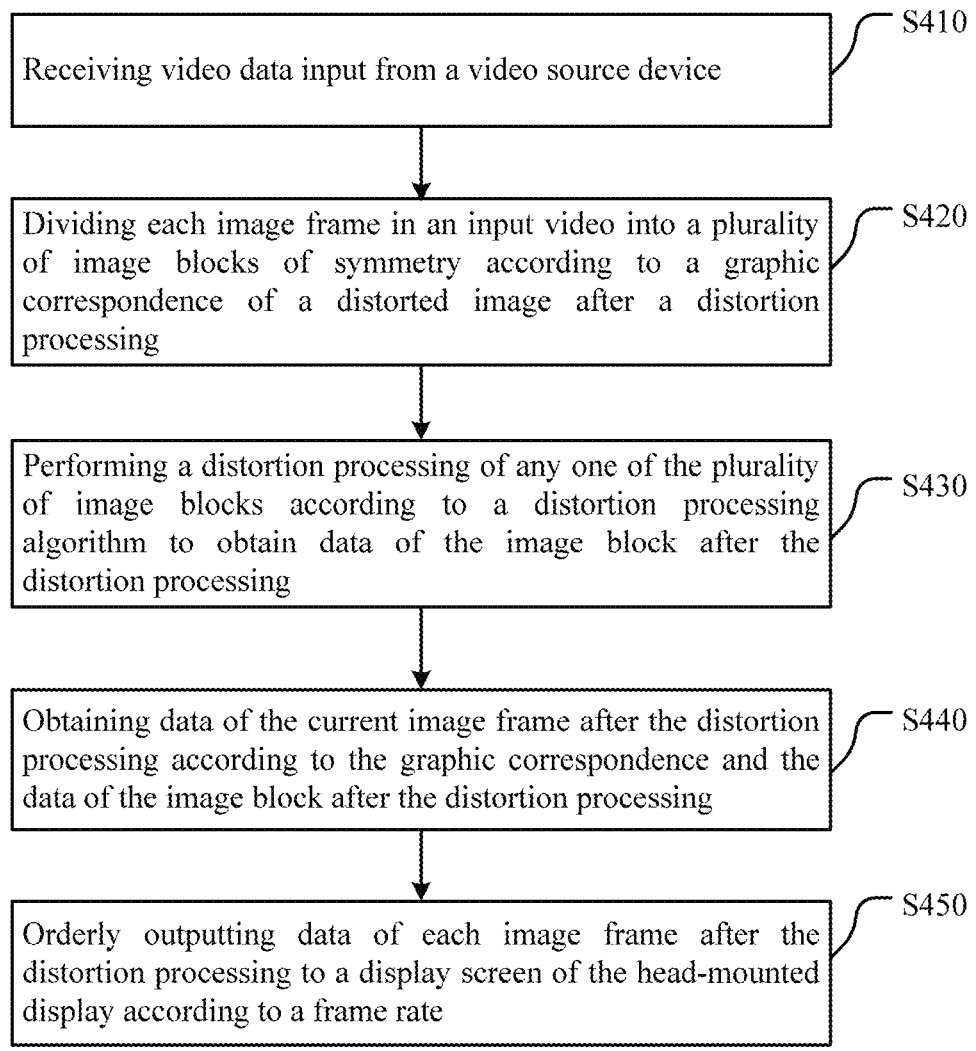
FIG. 4 illustrates a flow chart of a video data processing method of a head-mounted display according to an embodiment of the present invention.

FIG. 4 illustrates a flow chart of a video data processing method of a head-mounted display according to an embodiment of the present invention. As illustrated in FIG. 4, the method comprises:

step S410: receiving video data input from a video source device;

step S420: dividing each image frame in an input video into a plurality of image blocks of symmetry according to a graphic correspondence of a distorted image after a distortion processing;

step S430: performing a distortion processing of any one of the plurality of image blocks according to a distortion processing algorithm to obtain data of the image block after the distortion processing;

step S440: obtaining data of the current image frame after the distortion processing according to the graphic correspondence and the data of the image block after the distortion processing;

step S450: orderly outputting data of each image frame after the distortion processing to a display screen of the head-mounted display according to a frame rate.

It is clear that the method as illustrated in FIG. 4 divides each image frame in the video data into a plurality of image blocks of symmetry according to a graphic correspondence of an image after a distortion processing, performs a distortion processing of any one of the plurality of image blocks, and obtains data of the current image frame after the distortion processing according to the graphic correspondence and the data of the image block after the distortion processing. Through this solution, the method completes the distortion processing of each image frame in the video, and outputs and displays the distortion-processed video on the display screen, so that the user can view a normal 2D or 3D effect. By dividing the image frame into blocks, this solution realizes a transmission and processing of image data in the video in a block unit, in substitution of the processing in a frame unit in the prior art, and largely improves the transmission bandwidth utilization ratio. In addition, for an image frame, the distortion processing of a whole image frame can be completed just by selecting a singular image block, thereby greatly improving the distortion processing efficiency of the video data, ensuring a smooth video playing, and provides the user with more perfect visual experiences.

In one embodiment of the present invention, before dividing each image frame in the input video into a plurality of image blocks according to the graphic correspondence of a distorted image after a distortion processing, the method as illustrated in FIG. 4 further comprises: converting image frames in the input video into a uniform format.

In one embodiment of the present invention, the steps of the method as illustrated in FIG. 4 are specifically realized as follows:

Step S430 of performing a distortion processing of any one of the plurality of image blocks according to a distortion processing algorithm to obtain data of the image block after the distortion processing comprises: according to a Map relation of the image block in a coordinate mapping Map relation between pixels points of a same image frame before and after a distortion processing, assigning pixel values of pixel points at coordinates of the image block before the distortion processing to pixel points at corresponding coordinates after the distortion processing, so as to obtain data of the image block after the distortion processing.

Specifically, in order to improve the image quality after the distortion processing and avoid any mutation of pixel value therein, assigning pixel values of pixel points at coordinates of the image block before the distortion processing to pixel points at corresponding coordinates after the distortion processing, so as to obtain data of the image block after the distortion processing means: for each pixel point of an image block before a distortion processing, acquiring pixel values of a plurality of pixel points around the pixel point, obtaining an optimal pixel value of the pixel point by an interpolation calculation, assigning the optimal pixel value to a pixel point at corresponding coordinate after the distortion processing, obtaining data of the image block after the distortion processing according to optimal pixel values of all pixel points in the image block before the distortion processing.

Step S440 of obtaining data of the current image frame after the distortion processing according to the graphic correspondence and the data of the image block after the distortion processing comprises: obtaining data of the current image frame after the distortion processing through a mirror-image relation according to the graphic correspondence and the data of the image block after the distortion processing.

In another embodiment of the present invention, in order to reduce the mathematical operation load during the distortion processing within a visual accuracy range acceptable to the user, in the method as illustrated in FIG. 4, step S430 of performing a distortion processing of any one of the plurality of image blocks according to a distortion processing algorithm to obtain data of the image block after the distortion processing comprises:

step S431: amplifying coordinate data of the image block before the distortion processing for a certain times;

step S432: discarding corresponding decimal places of the coordinate data in the Map relation, amplifying the coordinate data with corresponding decimal places discarded for a certain times and then rounding down the same to obtain a Map relation of an integer form;

step S433: assigning optimal pixel values of pixel points at coordinates of the amplified image block before the distortion processing to pixel points at corresponding coordinates after the distortion processing according to the Map relation of an integer form, to obtain data of the amplified image block after the distortion processing; and step S434: contracting the coordinate data of the amplified image block after the distortion processing for a certain times to obtain data of the image block after the distortion processing.

The embodiments of the video data processing method of the head-mounted display as illustrated in FIG. 4 are corresponding to those of the video data processing performed by various modules of the aforementioned head-mounted display, and hence are omitted herein.

In conclusion, the technical solutions provided by the present invention complete a distortion processing of each image frame in the video, and output the distortion-processed video on the display screen, so that the user views a normal 2D or 3D effect. The present invention has the following beneficial effects: 1. by dividing the image frame into blocks, a transmission and processing of image data in the video in a block unit is realized, in substitution of the processing in a frame unit in the prior art, thus the data is stored in blocks and the volume of stored data is reduced; 2. For a image frame, the distortion processing of a whole image frame can be completed just by selecting a singular image block, thereby greatly improving the distortion processing efficiency of the video data; 3. through an interpolation calculation of the optimal pixel value at each pixel point during the distortion processing of the image block, the variation of pixel value in the image frame after the distortion processing is more smooth, and the distortion processing quality is improved; and 4. by processing the coordinate data in the coordinate mapping Map relation, the accuracy of the distortion processing is increased. The above beneficial effects ensure a smooth video playing of the head-mounted display, and provide the user with more perfect visual experiences.

The above descriptions are just preferred embodiments of the present invention, rather than limitations to the protection scope thereof. Any amendment, equivalent replacement, improvement, etc. made within the spirit and principle of the present invention shall fall within the protection scope of the present invention.

The invention claimed is:

1. A head-mounted display comprising:
a video input module configured to receive video data input from a video source device, and orderly output data of each image frame in the video data to a distortion processing module comprising a DDR read-write control module for controlling reading and writing of data of image blocks;
the distortion processing module and DDR read-write control module are configured to provide at least the following operations:
  a) store the distortion processing algorithm, which indicates a coordinate mapping relation between pixel points of a same image frame before and after the distortion processing,
  b) receive data of input image frames,
  c) divide each input image frame into a plurality of image blocks of symmetry according to a graphic correspondence of a distorted image, and select one image block from the plurality of image blocks;
  d) perform distortion processing on the selected one image block according to a distortion processing algorithm to obtain data of the one image block after the distortion processing, and
  e) obtain data of a current image frame after the distortion processing through a mirror-image relation according to both of the following: i) the graphic correspondence and ii) the data of the one image block after the distortion processing;
a video data buffering module configured to acquire the data of the image blocks from the DDR read-write control module and buffer the same, and output the buffered data of the image blocks to a distorted data acquiring module;
a data buffering module configured to acquire the coordinate mapping relation from the DDR read-write control module and buffer the same, and output the buffered coordinate mapping relation to the distorted data acquiring module;
the distorted data acquiring module configured to assign pixel values of pixel points at coordinates of an image block before the distortion processing to pixel points at corresponding coordinates after the distortion processing according to the coordinate mapping relation of the image block, so as to obtain data of the image block after the distortion processing; and
a video output module configured to orderly output data of each image frame after the distortion processing to a display screen of the head-mounted display according to a frame rate.

2. The head-mounted display according to claim 1, further comprising:
a graph zooming module;
the video input module is further configured to orderly output data of each image frame in the video data to the graph zooming module; and
the graph zooming module is configured to convert image frames into a uniform format, and output data of each image frame in the uniform format to the distortion processing module.

3. The head-mounted display according to claim 1, wherein,
the distorted data acquiring module is further configured to, for each pixel point of an image block before a distortion processing, acquire pixel values of a plurality of pixel points around the pixel point, obtain an optimal pixel value of the pixel point by an interpolation calculation, assign the optimal pixel value to a pixel point at corresponding coordinate after the distortion processing, and obtain data of the image block after the distortion processing according to optimal pixel values of all pixel points in the image block before the distortion processing.

4. The head-mounted display according to claim 3, wherein, the distorted data acquiring module is further configured to
  a) amplify coordinate data of an image block before a distortion processing for a certain times;
  b) discard corresponding decimal places of the coordinate data in the coordinate mapping relation;
  c) amplify the coordinate data with corresponding decimal places discarded for a certain times and then round down the same to obtain a coordinate mapping relation of an integer form;
  d) assign optimal pixel values of pixel points at coordinates of the amplified image block before the distortion processing to pixel points at corresponding coordinates after the distortion processing according to the coordinate mapping relation of an integer form, to obtain data of the amplified image block after the distortion processing; and
  e) contract the coordinate data of the amplified image block after the distortion processing for a certain times to obtain data of the image block after the distortion processing.

5. A video data processing method of a head-mounted display, the method comprising:
receiving video data input from a video source device;
dividing each image frame in an input video into a plurality of image blocks of symmetry according to a graphic correspondence of a distorted image, and selecting one image block from the plurality of image blocks;

performing distortion processing on the selected one image block according to a distortion processing algorithm to obtain data of the image block after the distortion processing, including assigning pixel values of pixel points at coordinates of the image block before the distortion processing to pixel points at corresponding coordinates after the distortion processing, according to a coordinate mapping relation of the image block in a coordinate mapping relation between pixels points of a same image frame before and after a distortion processing, so as to obtain data of the image block after the distortion processing wherein assigning the pixel values for each pixel point of the image block before the distortion processing includes,
  a) acquiring pixel values of a plurality of pixel points around the pixel point,
  b) obtaining an optimal pixel value of the pixel point by an interpolation calculation,
  c) assigning the optimal pixel value to a pixel point at corresponding coordinate after the distortion processing; and
  d) obtaining data of the image block after the distortion processing according to optimal pixel values of all pixel points in the image block before the distortion processing;

obtaining data of a current image frame after the distortion processing through a mirror-image relation according to both of the following: i) the graphic correspondence and ii) the data of the image block after the distortion processing; and orderly outputting data of each image frame after the distortion processing to a display screen of the head-mounted display according to a frame rate.

6. The method according to claim 5, including converting image frames in the input video into a uniform format before dividing each image frame in the input video into the plurality of image blocks according to the graphic correspondence of the distorted image after the distortion processing.

7. The method according to claim 5, wherein before, acquiring pixel values of the plurality of pixel points around the pixel point, the method further comprises:
  a) amplifying coordinate data of the image block before the distortion processing for a certain times;
  b) discarding corresponding decimal places of the coordinate data in the coordinate mapping relation; and
  c) amplifying the coordinate data with corresponding decimal places discarded for a certain times and then rounding down the same to obtain a map relation of an integer form, wherein assigning the optimal pixel value to the pixel point at corresponding coordinate after the distortion processing to obtain data of the image block after the distortion processing comprises:
  a) assigning optimal pixel values of pixel points at coordinates of the amplified image block before the distortion processing to pixel points at corresponding coordinates after the distortion processing according to the coordinate mapping relation of an integer form, to obtain data of the amplified image block after the distortion processing; and
  b) contracting the coordinate data of the amplified image block after the distortion processing for a certain times to obtain data of the image block after the distortion processing.

* * * * *